United States Patent

[11] 3,627,360

[72] Inventor Harmond E. Berno
Farmington, Mich.
[21] Appl. No. 41,156
[22] Filed May 25, 1970
[45] Patented Dec. 14, 1971
[73] Assignee Pennsylvania Wire Rope Corporation
Williamsport, Pa.

[54] CONTROL CABLE AND ANCHOR ASSEMBLY
21 Claims, 16 Drawing Figs.
[52] U.S. Cl. .................................................. 287/20 R,
74/501
[51] Int. Cl. .................................................. F16b 9/00
[50] Field of Search .................................................. 287/20 R;
285/162; 248/56; 74/501

[56] References Cited
UNITED STATES PATENTS
3,221,572 12/1965 Swick .......................... 285/162
3,366,405 1/1968 Sevrence ...................... 74/501
3,528,313 9/1970 Berno ......................... 74/501

Primary Examiner—David J. Williamowsky
Assistant Examiner—Andrew V. Kundrat
Attorney—Barnes, Kisselle, Raisch & Choate ABSTRACT: One part of a cable anchor comprises a sleeve adapted to be swaged around a cable sheath and having one or more receptacles therein. The other part has resilient prongs bendable inwardly for insertion within the sleeve. Outward projections on the prongs engage within the receptacles when the prongs return resiliently outwardly to fasten the two parts together. When the cable sheath is inserted into the fastened parts, it prevents inward movement of the prongs and locks the parts together. The sleeve is swaged down around the cable sheath to complete the assembly.

PATENTED DEC 14 1971
3,627,360
SHEET 1 OF 3
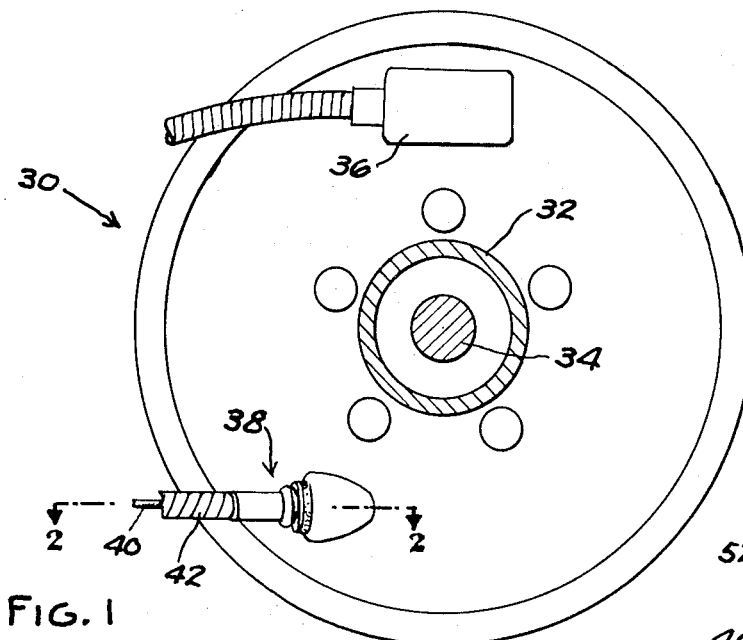
FIG. 1
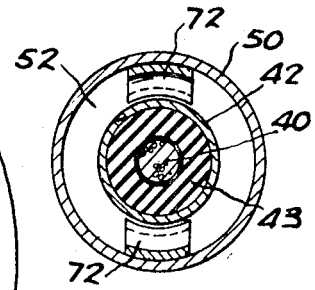
FIG. 3
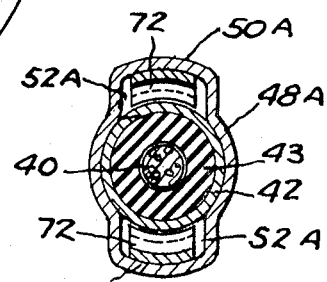
FIG. 5A
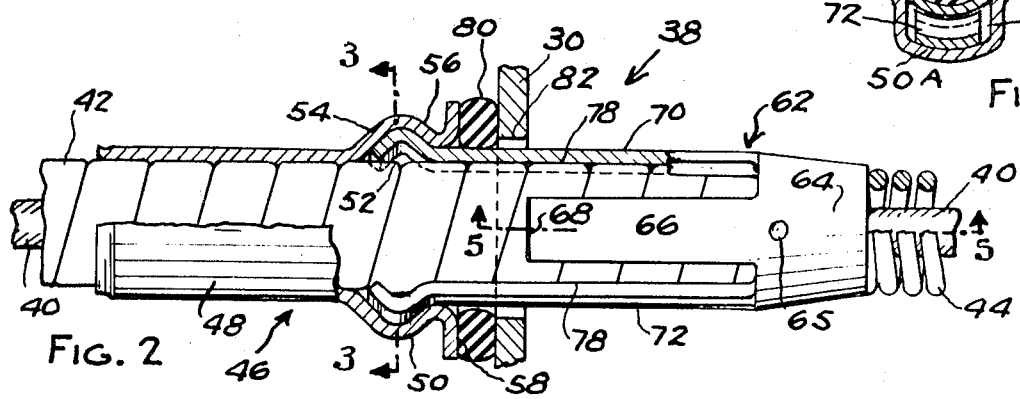
FIG. 2
FIG. 4
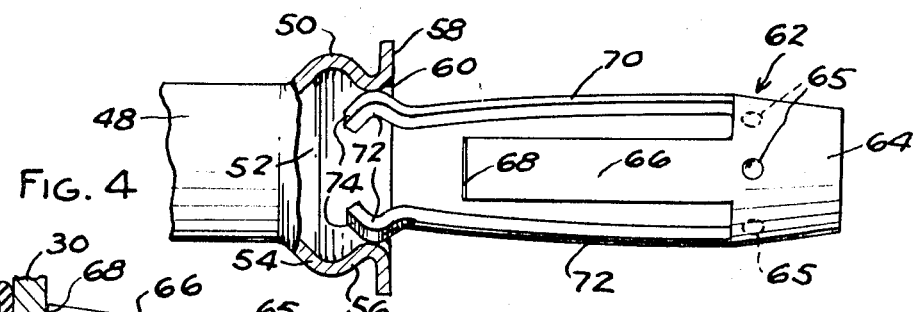
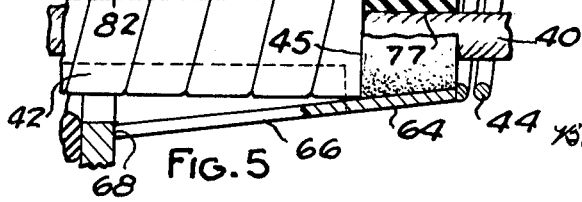
FIG. 5
INVENTOR.
HARMOND E. BERNO
BY
Barnes, Kisselle, Raisch & Choate
ATTORNEYS INVENTOR.
HARMOND E. BERNO
BY
Barnes, Kisselle, Raisch & Choate
ATTORNEYS

CONTROL CABLE AND ANCHOR ASSEMBLY

This invention relates to an assembly of a control cable movable within a sheath and an anchor structure affixed to the sheath by which it can be anchored against substantial longitudinal or lateral movement within an opening in a support. Typically, the cable and sheath are utilized to control parking or emergency brakes on automotive vehicles.

More particularly, the anchor structure is of the type which has spring fingers angled outwardly from the sheath. When the sheath is inserted through an opening, the fingers deflect inwardly to pass therethrough and thereafter snap outwardly to engage portions of the support outward of the opening to prevent withdrawal of the sheath from the opening. The anchor has an abutment of larger cross dimension than the opening, which limits further insertion of the sheath through the opening after the spring fingers have snapped outwardly.

Typically, such a cable anchor comprises two parts, one of which is securely fastened to the cable sheath and the other of which is provided with the spring fingers which are pushed through the opening in the support. These two parts must be locked together. In the past, this has been done in numerous ways, none of which has been completely satisfactory from the standpoint of cost, convenience of assembly, size and effectiveness.

The object of the present invention is to provide a combination cable sheath and anchor structure which is relatively simple and inexpensive and which is improved to facilitate quick, convenient assembly and effective locking of the parts together and in which the lateral dimensions of the assembly can be kept to a minimum.

In general, the invention contemplates the use of a sleeve adapted to be swaged down into anchored engagement on a cable sheath and having one or more receptacles therein. The spring finger element is provided with resilient prongs having outward projections thereon. The prongs are bendable inwardly for insertion within the sleeve and when the prongs return resiliently outwardly, the projections thereon engage within the receptacles to fasten the two parts together. When the sheath is inserted to the two parts, the outer surface thereof engages the inner surfaces of the prongs and prevents them from moving inwardly so that the projections thereon are locked within the receptacles in the sleeve. The sleeve is swaged downwardly around the sheath to complete the assembly.

In the drawings:

FIG. 1 is a partly diagrammatic elevational view illustrating a brake backing plate with a brake cable and anchor structure according to this invention mounted thereon.

FIG. 2 is an enlarged generally sectional view on line 2—2 of FIG. 1.

FIG. 3 is a sectional view on line 3—3 of FIG. 2.

FIG. 4 is a fragmentary view partly in elevation and partly in section illustrating a step in assembly of the anchor parts.

FIG. 5 is a fragmentary view partly in elevation and partly in section illustrating structural details of the assembly.

FIG. 5A is a view similar to FIG. 3 but showing a modified form of the invention.

Figures 6, 7:
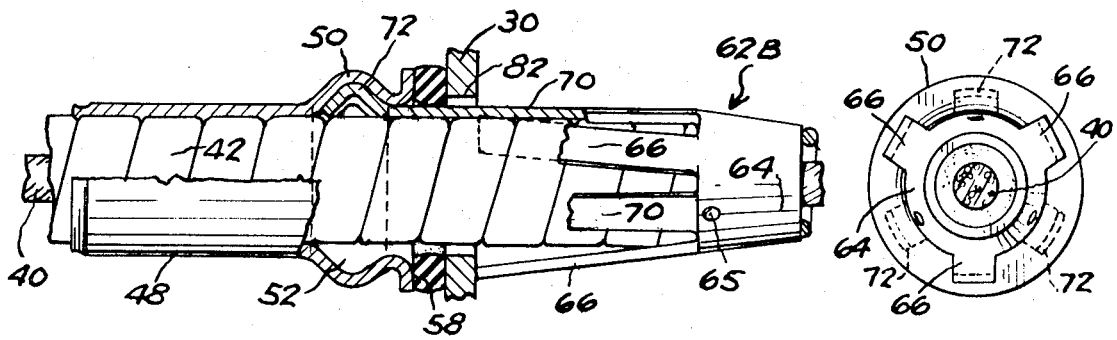
FIG. 6 is a view similar to FIG. 2 showing a modified form of the invention.
FIG. 7 is an end view of the structure shown in FIG. 6 prior to insertion through the backing plate.

Shown in FIG. 1 is a brake-backing plate 30 mounted on a housing 32 for an axle 34, the brake mechanism (not shown) associated with the backing plate being actuated primarily by a hydraulic cylinder 36. A brake cable and anchor assembly 38 according to this invention is secured to backing plate 30. The assembly includes a brake cable 40 typically made of wire rope longitudinally slidable through an outer sheath 42 typically formed of helically wrapped wire or metal strip. As is conventional, a liner 43 of plastic or the like is provided between cable 40 and sheath 42 (FIG. 3). When cable 40 is pulled to the left, as FIG. 2 is viewed, the brake mechanism is shifted against the action of a compressed coil spring 44 to apply the brakes; and when the pulling force on the cable is relieved, spring 44 shifts the brake mechanism to release the brakes. Sheath 42 has an end face 45 which serves a purpose to be described.

The anchor structure 46 includes a soft metal sleeve 48 which fits around sheath 42. Adjacent one end, sleeve 48 is bulged radially outwardly at 50 to define an annular receptacle or socket 52 disposed laterally outwardly of sheath 42. The socket includes an outwardly flared portion 54 and an inwardly returned portion 56. The end of sleeve 48 adjacent socket 52 is flanged outwardly to provide an axially disposed annular shoulder 58. Between socket portion 56 and shoulder 58 is a cam surface 60.

The other part of the anchor structure comprises a spring steel member 62 having a truncated conical ring 64 adjacent one end. Member 62 has indentations 65 at three angularly spaced locations around the base of conical ring 64. Two spring fingers 66 are integrally attached to the ring at diametrically opposite locations. The fingers extend along the conical slant height of ring 64 in a direction toward sleeve 48 and terminate at free ends 68. Two prongs 70 are also integrally attached to ring 64 at diametrically opposite locations. Prongs 70 and fingers 66 are disposed in circumferentially alternate arrangement with respect to ring 64. Prongs 70 have free end portions 72 which are bent to provide outward projections whose shape is generally complemental to the interior of receptacle 52. The free extremities 74 of projections 72 provide cam surfaces for a purpose to be described.

To assemble the two parts 48, 62 of the anchor structure, cam surfaces 74 on prongs 70 are engaged against cam surface 60 on sleeve element 48. The two parts are then pushed longitudinally toward each other. Cam surfaces 60, 74 deflect prongs 70 resiliently inwardly as the two parts move toward each other to the position of FIG. 4. Thereafter, when the cam surfaces pass beyond registry, projections 72 on the prongs snap outwardly into annular socket 52 in sleeve 48. The two parts are thus fastened together.

An elastomeric plug 76 of rubber, plastic, or the like is inserted into spring element 62 so that its end portion bottoms in tapered ring 64 as shown in FIG. 5. Sheath 42 is inserted longitudinally through sleeve 48 and prongs 70 until end face 45 bottoms against indentations 65. End face 45 also compresses plug 76 with sufficient force to cause whatever slack may exist between projections 72 and receptacle 52 to be taken up. Plug 76 has a longitudinal opening 77 through which cable 40 extends for attachment to the brake mechanism. Sleeve 48 is now swaged down around sheath 42 to permanently anchor the sleeve and sheath together. During this step, some of the metal of the sleeve extrudes inwardly into the cracks between adjacent convolutions of the sheath.

The exterior of the sheath engages against the inner surfaces 78 of prongs 70 and thereby prevents the prongs from deflecting inwardly under any tension which may be applied to sleeve 48 and spring element 60. Thus, projections 72 are retained within receptacle 52, and the two anchor parts are locked securely together.

At any convenient time prior to assembly of the cable and anchor structure 38 with a backing plate 30, a seal ring 80 of rubber or other suitable elastomeric material is placed around the assembly adjacent shoulder 58.

In use, conical ring 64 is inserted into an opening 82 in backing plate 30 and spring element 62 is pushed through the opening until the free ends 68 of fingers 66 pass through the opening. During this process, fingers 66 are deflected resiliently inwardly and then snap outwardly to engage backing plate 30 outwardly of opening 82 (FIG. 5). This prevent withdrawal of spring element 62 through opening 82 and thereby secures sleeve 48 and sheath 42 in anchored relation to backing plate 30.

The longitudinal distance between shoulder 58 and spring ends 68 is such that seal ring 80 is slightly compressed between shoulder 58 and backing plate 30. Seal ring 80 inhibits access of dirt and other foreign matter through opening 82 to the inner side of plate 30. Shoulder 58 provides a positive stop which limits further insertion of cable and anchor assembly 38 through opening 82 after free ends 60 of spring fingers 66 have passed through the opening. Interengaged end face 45 and indentations 65 provide a positive stop which prevents relative longitudinal movement of member 62 and sheath 42 when cable 40 is placed under tension.

The interlocking of projections 72 and receptacles 52 is strong enough to withstand tensile force on cable sheath 42 of a magnitude greater than that required to spread the convolutions of the sheath. The overall diameter of anchor structure 46 on the outer side of plate 30, i.e., to the left of plate 30 as the drawings are viewed, need be no more than slightly greater than the diameter of opening 82. The amount of metal required to make the two parts and attach them together is less than that required in prior structures. Sleeve element 48 and spring element 62 are both inexpensive and easily made in high-production quantities, for example, in progressive dies. The parts are quickly and easily assembled.

The structure shown in FIG. 5A is, in general, similar to that described above except that sleeve 48A is fashioned to provide two diametrically opposite outward bulges 50A forming two receptacles or sockets 52A within which projections 72 on prongs 70 engage. With this structure, annular shoulder 58 is replaced by two diametrically oppositely disposed shoulders (not shown), one adjacent each bulge 50A.

In general, the structure of FIGS. 2–5 is preferable to that of FIG. 5A for several reasons. First of all, sleeve 48 and spring element 62 do not require any relative rotational orientation or indexing in order to insert projections 72 within the single annular receptacle 52. Secondly, the complete annular shoulder 58 provides greater stability against tilting relative to plate 30; and thirdly, if such tilting should occur, annular shoulder 58 would have less tendency to chew into the metal of plate 30 than would spaced-apart shoulders.

The structure illustrated in FIGS. 6 and 7 is similar to that shown in FIGS. 2–5 except that spring element 62B has three each spring fingers 66 and prongs 70 attached to conical ring 64. While this structure may be preferable under certain conditions, it is contemplated that, in general, the simpler structure of FIGS. 2–5 will be adequate and preferable.

Figures 8, 9:
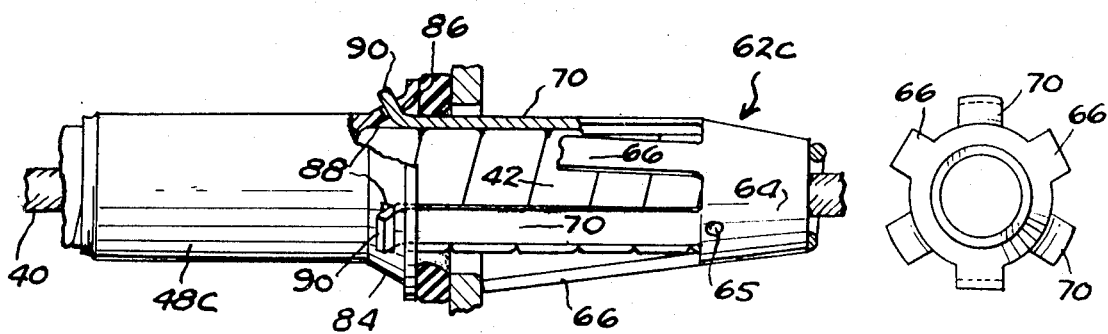
FIG. 8 is a view similar to FIG. 2 showing a modified form of the invention.
FIG. 9 is an end view of one of the parts of the anchor structure illustrated in FIG. 8.
Figure 10:
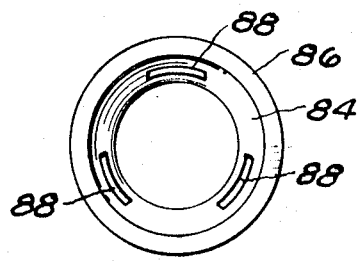
FIG. 10 is an end view of the other part of the anchor structure illustrated in FIG. 8.

The structure shown in FIG. 8–10 is, in general, similar to that of FIGS. 2–5 except that sleeve 48C is provided with an angularly outwardly flared portion 84 which terminates in an annular shoulder 86. Flared portion 84 has circumferentially distributed openings 88 through which outward projections 90 on spring fingers 70 project. In this case, the outward projections comprise lugs angled outwardly at an angle generally opposite to that of flared portion 84.

Spring element 62C of this modification is illustrated as having three each of spring fingers 66 and prongs 70, and flared portion 84 of sleeve 48C correspondingly has three receptacles 88. However, it is to be understood that this form of the invention might also have merely two each of such elements.

In the specific structure illustrated, sleeve 48C and spring element 62C are assembled by bending prongs 70 inwardly, aligning lugs 90 with receptacles 88, and releasing the prongs to permit the lugs to enter the receptacles. However, flared portion 84 could be extended to a greater diameter or lugs 90 shortened or both so that the inner surface of the flared portion would serve as a cam to facilitate camming of the lugs inwardly when the two elements are pushed together. This would facilitate an assembly procedure similar to that in the FIGS. 2–5 form.

While this form of the invention is suitable in certain applications, the form shown in FIG. 2–5 is preferable in manufacturing facilities where axial force is applied in the region of flare 84 or flange 86 in order to push the assembly through opening 30. Under such a procedure, lugs 90 could be damaged or broken. In contrast, outward projections 72 in the FIGS. 2–5 form are beyond reach of any external applying tool.

Figure 11:
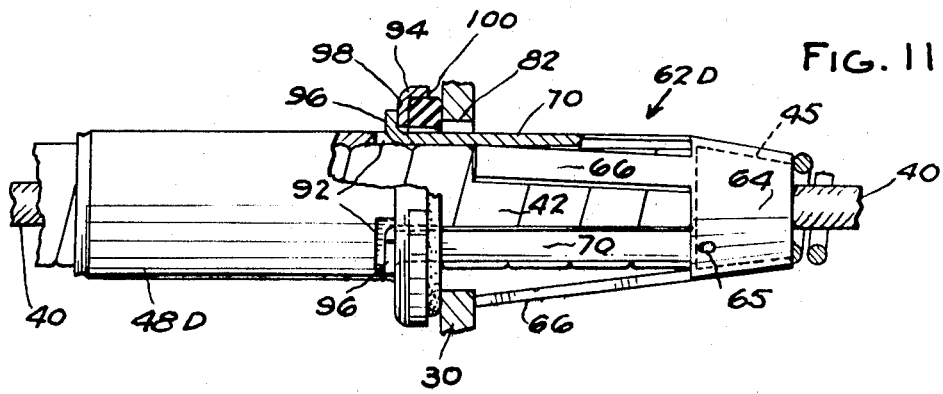
FIG. 11 is a view similar to FIG. 2 showing a modified form of the invention.
Figure 13:
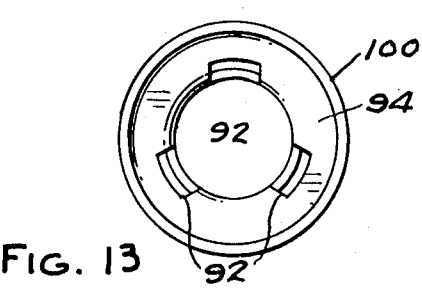
FIG. 13 is an end view of the other part of the anchor structure illustrated in FIG. 11.
Figure 12:
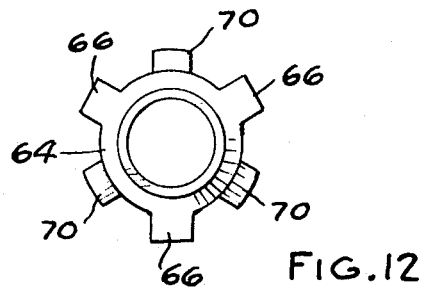
FIG. 12 is an end view of one of the parts of the anchor structure illustrated in FIG. 11.

The form of the invention illustrated in FIGS. 11–13 is, in general, similar to that of FIGS. 8–10 except that receptacles 92 in sleeve 48 comprise openings partly in an axially extending portion of sleeve 48D and partly in a radially outwardly flanged portion 94 thereof. The outward projections on prongs 70 are provided by radially outwardly extending lugs 96 which engage the rearward face 98, or left face as FIG. 11 is viewed, of flange 94. The outward edge of flange 94 is turned forwardly, or to the right, and the forward face 100 of the resulting ring forms a stop shoulder analogous to shoulder 58 of FIGS. 2 and 3.

To assemble sleeve 48D and spring element 62D, prongs 70 are bent inwardly and inserted into sleeve 48D so that lugs 96 are aligned with receptacles 92, whereupon the prongs are released so that lugs 96 extend outwardly through the receptacles. In this form of the invention also, spring element 62D could be provided with two each of spring fingers 66 and prongs 70 rather than the three shown and sleeve 48D could be provided correspondingly with two receptacles 92 instead of the three shown. In general, the form of the invention illustrated in FIGS. 2–5 is considered preferable to this form of the invention for reasons similar to those discussed with respect to the FIGS. 8–10 form of the invention.

Figure 14:
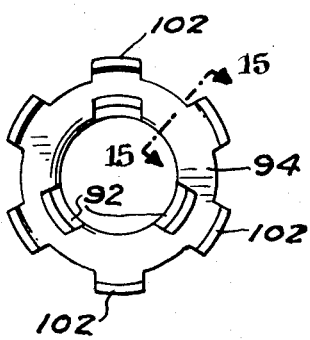
FIG. 14 is a view similar to FIG. 13 but showing a modified form of anchor part.
Figure 15:
FIG. 15 is a sectional view on line 15-15 of FIG. 14.

If desired, the forwardly turned position of flange 94 could be interrupted to provide a plurality of stop shoulders 102 (FIGS. 14 and 15) rather than the single continuous annular shoulder 100. However, as was brought out above in the comparison of the FIG. 3 and FIG. 5A forms of the invention, in general, the single continuous ring type shoulder is preferred for stability and wear purposes.

I claim:

1. In an assembly of a control cable longitudinally movable within a sheath and an anchor having two attached parts, one of which is fixed on said sheath and the other of which has spring finger means resiliently deflectable inwardly upon insertion through an opening and snappable outwardly to prevent withdrawal of the sheath through the opening, improved structure which comprises, receptacle means on said one part, and prong means on said other part provided with means projecting laterally outwardly with respect to said sheath, said prong means being laterally inwardly deflectable, and said projecting means being engageable within said receptacle means responsive to outward movement of said prong means from inwardly deflected condition, said prong means and receptacle means when interengaged forming an attachment which secures said two parts together, said sheath being engaged against laterally inner portions of said prong means and thereby preventing inward deflection thereof to retain said projecting means in engaged condition within said receptacle means.

2. The structure defined in claim 1 wherein said attachment is spaced longitudinally from said finger means a distance such that said attachment and finger means are disposed at opposite ends of an opening through which said finger means is adapted to be inserted.

3. The structure defined in claim 2 wherein said one part has laterally outwardly extending means adjacent said receptacle means forming an obstruction which limits further insertion of said sheath after said finger means has passed through such opening.

4. The structure defined in claim 1 wherein said prong means is resiliently inwardly deflectable.

5. The structure defined in claim 4 wherein said one part has a surface portion adjacent said receptacle means positioned for engagement in a longitudinal direction by said projecting means, said surface portion and projecting means being cooperable responsive to movement of said parts longitudinally toward each other to deflect said prong means inwardly, said prong means being resiliently movable outwardly when said projecting means passes longitudinally beyond said surface portion to engage said projecting means within said receptacle means.

6. The structure defined in claim 1 wherein said one part comprised a sleeve surrounding said sheath and having portions which define said receptacle means.

7. The structure defined in claim 6 wherein said receptacle means comprises portions of said sleeve flared laterally outwardly of said sheath and then returned inwardly toward said sheath.

8. The structure defined in claim 7 wherein said sleeve portions are circumferentially substantially continuous so that said receptacle means comprises a single annular socket.

9. The structure defined in claim 8 wherein said projecting means comprises an end portion of said prong means configured complementally to the interior of said socket.

10. The structure defined in claim 9 wherein said end portion of said prong means and said inwardly returned portion of said sleeve have surfaces cooperable to cam said prong means inwardly responsive to longitudinal movement toward each other of said parts with said surfaces engaged, said prong means being resiliently snappable outwardly when said surfaces pass beyond interengagement, whereby to engage said projecting means in said socket.

11. The structure defined in claim 10 wherein said prong means comprises a plurality of prongs distributed circumferentially around said sheath.

12. The structure defined in claim 11 wherein there are two of said prongs disposed adjacent substantially opposite sides of said sheath.

13. The structure defined in claim 11 wherein said prongs and finger means are connected with a common ring substantially axially aligned with an end portion of said sheath.

14. The structure defined in claim 7 wherein said sleeve adjacent said inwardly returned portion thereof extends outwardly a distance greater than the diameter of an opening with which said assembly is adapted to be used and provides an obstruction which limits further insertion of said sheath through said opening after said finger means has passed therethrough.

15. The structure defined in claim 6 wherein said receptacle means comprises an opening in said sleeve portions through which said projecting means extends.

16. The structure defined in claim 15 wherein there are a plurality of said openings, and said prong means comprises a corresponding plurality of prongs, said outwardly projecting means comprising outwardly extending end portions of said prongs.

17. The structure defined in claim 16 wherein said sleeve adjacent said openings is flanged outwardly to provide an obstruction which limits further insertion of said sheath through said opening after said finger means has passed therethrough.

18. The structure defined in claim 16 wherein said sleeve portions are flared outwardly at a nonperpendicular angle to said sheath, said openings being disposed in said flared portion, said end portions projecting through said opening at a nonperpendicular angle to said sheath generally opposite to the first-mentioned angle.

19. The structure defined in claim 16 wherein said sleeve portions extend substantially axially of said sheath and said end portions extend substantially radially outwardly through said openings.

20. The structure defined in claim 19 wherein said sleeve adjacent said openings has a flange extending outwardly substantially radially of said sheath, said flange being engaged by portions of said end portions which project through said openings, said flange providing an obstruction which limits further insertion of said sheath through said opening after said finger means has passed therethrough.

21. The structure defined in claim 1 wherein said projecting means is substantially entirely housed within said receptacle means to protect said projecting means from contact with objects outside of said receptacle means.

* * * * *